Figure 1:
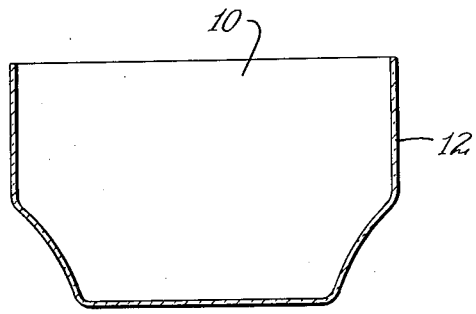

25534

Oct. 9, 1962      P. K. SCHILLING      3,057,016

METHOD OF MOLDING PLASTIC ARTICLES

Filed March 17, 1958

INVENTOR
Paul K. Schilling

BY Robert M. Dunning

ATTORNEY

United States Patent Office

3,057,016
Patented Oct. 9, 1962

3,057,016
METHOD OF MOLDING PLASTIC ARTICLES
Paul K. Schilling, St. Paul, Minn., assignor to Plastics, Inc., St. Paul, Minn., a corporation of Minnesota
Filed Mar. 17, 1958, Ser. No. 721,731
3 Claims. (Cl. 18—59)

This invention relates to an improvement in a method of molding plastic articles and deals particularly with a method of producing two toned plastic articles formed of two plies of thermoplastic resin.

In the production of plastic articles such as dishware and the like, it has long been considered desirable to produce articles having one surface of one color and another surface of another color. For example, in the production of plastic cups, it has been felt desirable to have an inner surface of one color such as white or a light pastel shade and to have the outer shell formed of a darker plastic. While such dishware could be painted or otherwise decorated, this is somewhat difficult and costly and the finished coatings are not particularly durable particularly on articles of thermoplastic material which cannot be baked at high temperatures to provide a more lasting finish, in the manner of glaze on dishware. Furthermore, while a thin coating can be painted or sprayed on a thermoplastic surface which will bond to the surface, this coating is apt to scratch or wear off in a relatively short time, as it is normally very thin.

An object of the present invention lies in the provision of a thermoplastic article comprising two laminations of plastic, the two laminations being of contrasting colors so as to enhance that appearance of the article. The finished article thus includes two separate laminations which are adhered or bonded together in such a way as to be inseparable at the completion of the molding operation.

A feature of the present invention resides in the provision of an article made of thermoplastic material which is formed by two separate molding operations. As a first step of the operation, a relatively thin lining shell is formed of thermoplastic resin of one color. This thin shell is removed form the mold and preferably inserted upon the male portion of a second die. A plastic of a different color is then injected into the second die, the plastic flowing about the thin shell and forming the outer shape of the article. During this second molding operation, the resin of the contrasting color heats the lining shell to such an extent that it actually tends to unite with the outer surface of the shell thus forming a firm bond between the two laminations to prevent any later separation.

A further feature of the present invention resides in the provision of a novel method of bonding together two laminations of thermoplastic resin through the use of two separate dies. The first die preferably forms a liner or shell and the second die provides a second layer of thermoplastic material which actually combines with the surface of the shell formed in the first die and thus is inseparably connected thereto.

These and other objects and novel features of the present invention will be more clearly and fully set forth in the following specification and claims.

In the drawings forming a part of the specification:
FIGURE 1 is a cross sectional view through a thin shell formed of thermoplastic material of one color.

Figure 2:
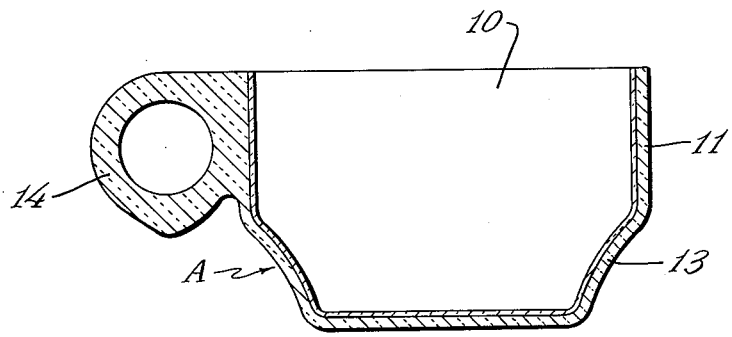

FIGURE 2 is a sectional view through a complete article showing the shell of FIGURE 1 firmly combined with the covering of thermoplastic resin of a contrasting color.

The drawings illustrate a thermoplastic article A which is in the form of a cup of the type used for containing tea or coffee. In its completed form, the cup includes an inner surface 10 of one color, and an outer surface 11 of a contrasting color. The appearance of the cup is thus enhanced by having a two toned appearance.

The method involved in the present invention is extremely simple in form. The method consists in injection molding in a suitable injection molding press, not shown in the drawings, a relatively thin shell 12 of plastic of one color, the purpose of this structure being to provide the inner surface 10 of the completed article. The shell 10 is of proper size and shape to form the inner surface of a plastic cup. While the thickness of the shell 12 may vary, in the present arrangement this shell is of a thickness of perhaps 15 to 25 thousandths of an inch. The shell 12 is formed thick enough so as to be self sustaining and so that it may be handled without unusual danger of breakage but is preferably sufficiently thin so that the exposed surface of the shell may be heated during a second molding operation to an extent sufficient to bond two laminations of thermoplastic material together. Obviously, the thicker the shell 12 is cast, the more is the difficulty in bonding the two laminations together.

The shells 12 are removed from the injection molding machine and each shell is usually placed upon the male portion of the molding die of a second mold. Actually, the male portion of the mold may be identical in both of the dies which are employed but normally the first male die is slightly larger due to shrinkage of the plastic. The second molding die has a larger molding cavity and the female portion of the die is shaped to provide the desired outer shape of the finished article.

After the shell 12 has been placed upon the male portion of the second die and the die closed, thermoplastic resin is injected into the mold cavity to form the shell enclosing body. In the particular arrangement illustrated, the second die is shaped to form a relatively thick outer lamination 13 and may also include other structures such as the handle 14 which need not be of two colors. The outer lamination and handle are thus formed during the second molding operation.

During the second molding operation, the plastic which is injected into the mold cavity under high pressure and elevated temperatures heats the outer surface of the inner shell 12 to an extent necessary to bond the two laminations securely together. At the same time, the temperature is insufficient to completely melt the inner liner and the temperature of the inner surface of the shell 12 may be controlled by controlling the temperature of the male portion of the die. In other words, the male portion of the die may be held at a temperature below the melting temperature of the plastic so as to prevent the inner surface 10 from changing its appearance. The thermoplastic material injected into the cavity during the second molding operation thus does not penetrate the inner shell and at the completion of the second molding operation the two laminations are firmly bonded together and the finished article has an inner surface of one color and an outer surface of a contrasting color. Articles of the type in question usually are hollow articles such as dishware or the like which have a concavo-convex surface, one surface of which is visible on the interior of the article and the other of which forms the exterior surface thereof.

In the foregoing description the inner shell is described as relatively thin as compared to the outer covering. This structure is employed in the production of an article such as a cup which has one or more handles which are cast with the outer covering in order to maintain better uniformity of thickness in the layer being cast, and to cause the plastic to flow more readily. However, in other articles, such as plates, bowls and the like, the laminations may be of equal thickness, or the inner liner may be thicker, if preferred.

In accordance with the patent statutes, I have described the principles of construction and operation of my improvement in a method of molding plastic articles, and while I have endeavored to set forth the best embodiment thereof, I desire to have it understood that changes may be made within the scope of the following claims without departing from the spirit of my invention.

I claim:

1. The method of forming concave thermoplastic articles through the use of two molds each including a plurality of mold sections, one of the sections of a first mold being substantially identical with one of the sections of the second mold and the other sections of said molds being of different sizes so as to make the void within said second mold larger than that of said first mold, the method including the steps of injecting thermoplastic resin into the first mold to produce a relatively thin walled article having one of its surfaces formed by said one mold section, removing the article formed and inserting the article into the second mold so that said one surface of the article thus formed in the first mold is in surface contact with the similar section of the second mold, injecting thermoplastic resin into the second mold while maintaining the similar mold surface at a temperature below the melting temperature of the article formed in the first mold, the thermoplastic resin injected into the second mold being sufficiently in excess of that inserted into the first mold to heat the exposed surface of the article formed in the first mold sufficiently to bond thereto without melting the surface of the article contacting the similar mold surface, the two layers being substantially coextensive.

2. The method of forming a concave plastic receptacle through the use of two molds each including a male and female mold section, the male sections of the two molds being substantially identical, and the female section of one mold being smaller in inner dimensions than the female section of the other mold, the method including the steps of injecting thermoplastic resin into the one mold to provide a relatively thin walled article, removing the article formed and inserting the article onto the male section of the other mold, injection thermoplastic resin into the other mold to provide an integral relatively thick wall while maintaining the male portion thereof at a temperature below the melting point of the thermoplastic resin and while heating the female portion of the mold above said melting point, the thermoplastic resin injected into the other mold being in sufficient excess of that injected in said one mold to heat the surface of the article formed in the one mold sufficiently to bond thereto while maintaining the surface engaging the male portion of the mold below the melting point.

3. The method of claim 2 and including the step of simultaneously forming a handle projecting from, and integral with, the covering of thermoplastic resin injected into the other mold.

References Cited in the file of this patent

UNITED STATES PATENTS

| | | |
|---|---|---|
| 2,244,565 | Nast | June 3, 1941 |
| 2,313,985 | Bradshaw | Mar. 16, 1943 |
| 2,377,393 | Wiley | June 5, 1945 |
| 2,514,076 | Kelley | July 4, 1950 |
| 2,609,570 | Danielson et al. | Sept. 9, 1952 |
| 2,698,464 | Wilson | Jan. 4, 1955 |